US006925195B2

(12) United States Patent
Cahill et al.

(10) Patent No.: US 6,925,195 B2
(45) Date of Patent: Aug. 2, 2005

(54) STABILIZATION OF THREE-DIMENSIONAL IMAGES IN A SCANNERLESS RANGE IMAGING SYSTEM

(75) Inventors: Nathan D. Cahill, Rochester, NY (US); Lawrence A. Ray, Rochester, NY (US); Joseph F. Revelli, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 617 days.

(21) Appl. No.: 10/156,530

(22) Filed: May 28, 2002

(65) Prior Publication Data

US 2003/0223618 A1 Dec. 4, 2003

(51) Int. Cl.$^7$ ................................................ G06K 9/00
(52) U.S. Cl. ...................................... 382/107; 382/154
(58) Field of Search .............................. 382/106, 107, 382/152, 154; 356/398, 463; 348/97, 208.99, 260, 262; 396/89, 155, 222, 311

(56) References Cited

U.S. PATENT DOCUMENTS

| | | | | |
|---|---|---|---|---|
| 4,935,616 A | | 6/1990 | Scott ........................... | 250/213 |
| 5,561,526 A | * | 10/1996 | Huber et al. ................. | 356/604 |
| 5,629,988 A | * | 5/1997 | Burt et al. .................... | 382/276 |
| 5,949,087 A | * | 9/1999 | Cooper .................. | 250/559.29 |
| 6,118,946 A | * | 9/2000 | Ray et al. ..................... | 396/89 |
| 6,349,174 B1 | * | 2/2002 | Ray et al. ................... | 396/106 |

FOREIGN PATENT DOCUMENTS

| EP | 1 117 251 A1 | 7/2001 | .......... H04N/5/232 |
|---|---|---|---|

OTHER PUBLICATIONS

"A fast algorithm for subpixel accuracy image stabilization for digital film and video" by Eroglu et al. *Proc. SPIE Visual Communications and Image Processing*, vol. 3309, pp. 786–797, 1998.

A Multiple View Geometry by R. Hartley and A. Zisserman. Cambridge University Press, 2000, Chapter 3.

The Phase Correlation Image Alignment Method, by C. Kuglin and D. Hines. *Proc. 1975 Int'l. Conf. on Cybernetics and Society*, pp. 163–165.

\* cited by examiner

*Primary Examiner*—Kanjibhai Patel
*Assistant Examiner*—Abolfazl Tabatabai
(74) *Attorney, Agent, or Firm*—David M. Woods

(57) ABSTRACT

A method for generating a stabilized three-dimensional image from a scannerless range imaging system comprises the steps of acquiring a bundle of three or more phase offset images corresponding to modulated illumination reflected from a scene, whereby one or more of the phase offset images includes image motion relative to another phase offset image; searching for a stable chain of phase offset images in the image bundle, wherein a stable chain is a collection of images that is obtained by testing the phase offset images against a confidence measure that separates less severe correctable image motion from more severe image motion and then populating the stable chain only with those phase offset images that meet the confidence measure for correctable image motion; correcting for the image motion in the stable chain of images if a stable chain of at least three phase offset images is found to exist; and computing a stabilized three-dimensional image using the phase offset images from the stable chain of phase offset images.

18 Claims, 5 Drawing Sheets

STABILIZATION OF THREE-DIMENSIONAL IMAGES IN A SCANNERLESS RANGE IMAGING SYSTEM

FIELD OF THE INVENTION

The invention relates generally to the field of digital image processing, and in particular to a technique for compensating for stabilization errors in the formation of a three-dimensional image from an image bundle captured from a scannerless range imaging system.

BACKGROUND OF THE INVENTION

U.S. Pat. No. 4,935,616 (further described in the Sandia Lab News, vol. 46, No. 19, Sep. 16, 1994) describes a scannerless range imaging system using either an amplitude-modulated high-power laser diode or an array of amplitude-modulated light emitting diodes (LEDs) to completely illuminate a target scene. An improved scannerless range imaging system that is capable of yielding color intensity images in addition to the 3D range images is described in commonly-assigned, U.S. Pat. No. 6,349,174 entitled "Method and Apparatus for a Color Scannerless Range Imaging System". As used herein, a scannerless range imaging system will be referred to as a "SRI system". In the formation of a three-dimensional image (which will herein refer to the combination of the intensity image and range image), the SRI system generates an "image bundle", which includes both the intensity image and a collection of phase offset images which are used to construct the range image. This formation of a three-dimensional image by the SRI system is more fully described in the "Detailed Description of the Invention" section of this disclosure.

Correct formation of a three-dimensional image by the SRI system assumes the system is stable, or not moving, during the capture of the collection of phase offset images. A typical duration might be anywhere from 0.3 to 2.0 seconds or more (based on the speed of the burst mode of a typical digital camera, such as the Kodak DC290 Zoom Digital Camera). If the SRI system is mounted on a tripod or a monopod, or placed on top of or in contact with a stationary object, then the stability assumption is likely to hold. However, if the collection of phase offset images is captured while the SRI system is held in the hands of the photographer, the slightest jitter or movement of the hands may introduce stabilization errors that will adversely affect the formation of the three-dimensional image. For another example of unwanted motion, consider that the collection of phase offset images is captured by a film SRI system, such as the system described in commonly assigned U.S. Pat. No. 6,118,946, "Method and apparatus for scannerless range image capture using photographic film." When the phase offset images are scanned, film positioning errors can contribute to an incorrect formation of the three-dimensional image.

The process of removing any unwanted motion from a sequence of images is called image stabilization. Some systems use optical, mechanical, or other physical means to correct for the unwanted motion at the time of capture or scanning. However, these systems are often complex and expensive. To provide stabilization for a generic digital image sequence, several digital image processing methods have been developed and described in the prior art.

A number of digital image processing methods use a specific camera motion model to estimate one or more parameters such as zoom, translation, rotation, etc. between successive frames in the sequences. These parameters are computed from a motion vector field that describes the correspondence between image points in two successive frames. The resulting parameters can then be filtered over a number of frames to provide smooth motion. An example of such a system can be found in a patent by Burt et al (U.S. Pat. No. 5,629,988). A fundamental assumption in these systems is that a global transformation dominates the motion between adjacent frames. In the presence of significant local motion, such as multiple objects moving with independent motion trajectories, these methods may fail due to the computation of erroneous global motion parameters. In addition, it may be difficult to apply these methods to a sequence of phase offset images because the intensity value at each pixel depends in part on the phase offsets used to capture each image. As a result of this dependence, sequential phase offset images may differ dramatically in overall intensity; only the information contained in the phase of the Fourier Transform of the image is similar.

Other digital image processing methods for removing unwanted motion make use of a technique known as phase correlation for precisely aligning successive frames. An example of such a method has been reported by Eroglu et al. ("A fast algorithm for subpixel accuracy image stabilization for digital film and video," in *Proc. SPIE Visual Communications and Image Processing*, Vol. 3309, pp. 786–797, 1998). These methods would be more applicable to the stabilization of a sequence of phase offset images from an SRI camera than the aforementioned methods because the correlation procedure only compares the information contained in the phase of the Fourier Transform of the images. However, these methods only apply to sequences that have no local motion, or alternatively, a user must select a region in consecutive frames that has no local motion. The dependence upon areas with no local motion and the necessity for user intervention are major drawbacks of these methods.

One special feature of the SRI system is that only three phase offset images are required to form a three-dimensional image. However, more than three phase offset images can be used, and the use of more than three phase offset images will increase the accuracy of the three-dimensional image in general. All of the aforementioned digital image processing methods for removing unwanted motion from image sequences remove this motion in every frame of the image sequence. Therefore, an additional drawback to all of the aforementioned methods is that there exist no mechanisms for selectively removing or ignoring any frames where the unwanted motion is deemed severe. If the unwanted motion is too large or localized in any of the phase offset images, any errors introduced by the removal method degrade the resulting three-dimensional image to a quality lower than it would have been had the corresponding phase offset images been ignored.

Therefore, there exists a need in the art for a method of generating a stabilized three-dimensional image from phase offset images captured by a scannerless range imaging system, where the phase offset images contain unwanted motion; such a method should be capable of correcting unwanted motion if that motion is small, and of removing one or more phase offset images from the image bundle if that image motion is large or localized.

SUMMARY OF THE INVENTION

The present invention is directed to overcoming one or more of the problems set forth above in connection with a scannerless range imaging system of the type comprising an illuminator for illuminating a scene with modulated illumination; an image modulating component for receiving and modulating the modulated illumination reflected from the scene; and an image capture element for capturing images output by the image modulating component, including a bundle of at least three phase offset images each incorporating a phase delay corresponding to the distance of objects in the scene from the illuminator, wherein each phase offset image also incorporates a phase offset unique for each image.

Briefly summarized, according to one aspect of the invention, a method for generating a stabilized three-dimensional image from such a scannerless range imaging system as described above comprises the steps of acquiring a bundle of three or more phase offset images corresponding to the modulated illumination reflected from the scene, whereby one or more of the phase offset images includes image motion relative to another phase offset image; searching for a stable chain of phase offset images in the image bundle, wherein a stable chain is a collection of images that is obtained by testing the phase offset images against a confidence measure that separates less severe correctable image motion from more severe image motion and then populating the stable chain only with those phase offset images that meet the confidence measure for correctable image motion; correcting for the image motion in the stable chain of images if a stable chain of at least three phase offset images is found to exist; and computing a stabilized three-dimensional image using the corrected phase offset images from the stable chain of phase offset images.

The invention has the advantages of correcting unwanted motion if that motion is small, and of removing one or more phase offset images from the image bundle if that image motion is large or localized, without incurring the penalty of having to capture more images to repopulate the image bundle if motion is observed in the captured images. Since use of the method effectively tolerates at least a small degree of global movement, the invention will also allow for range collection using cameras that lack sources of firm support, e.g., handheld cameras.

These and other aspects, objects, features and advantages of the present invention will be more clearly understood and appreciated from a review of the following description of the preferred embodiments and appended claims, and by reference to the accompanying drawings.

DETAILED DESCRIPTION OF THE INVENTION

Because range imaging devices employing laser illuminators and capture devices (including image intensifiers and electronic sensors) are well known, the present description will be directed in particular to elements forming part of, or cooperating more directly with, a method and/or system in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
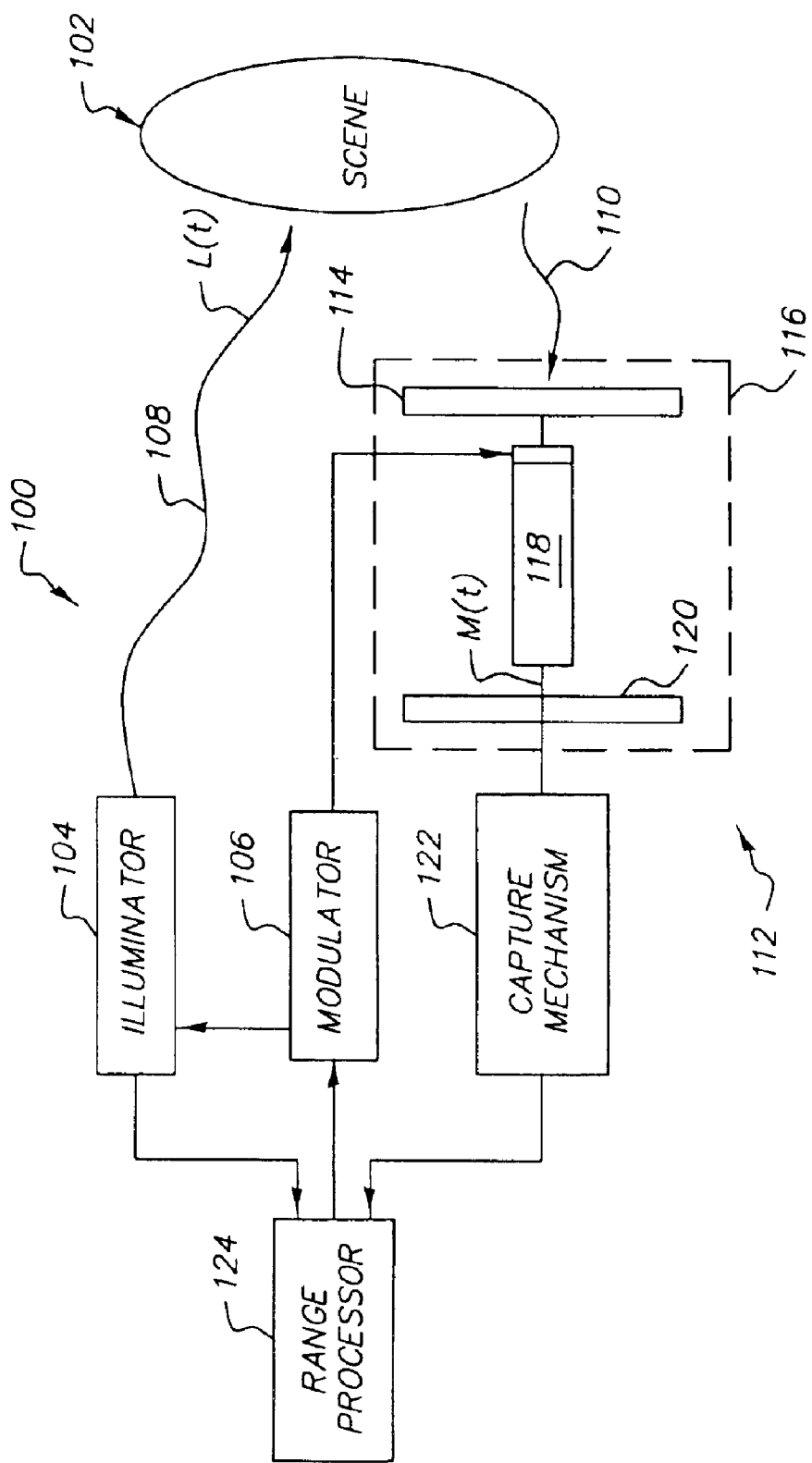
FIG. 1 is a block diagram of a scannerless range imaging system of the type known in the prior art.

It is helpful to review the principles and techniques involved in scannerless range imaging. Accordingly, referring to FIG. 1 (prior art), an SRI camera 100 is shown as a laser radar that is used to illuminate a scene 102 and then to capture an image bundle comprising a minimum of three images of the scene 102. An illuminator 104 emits a beam of electromagnetic radiation whose amplitude is controlled by a modulator 106. Typically, in the prior art, the illuminator 104 is a laser device that includes an optical diffuser in order to effect a wide-field illumination and remove modal structure. The modulator 106 provides a sinusoidal modulation. The modulated illumination source is modeled by:

$$L(t) = \mu_L + \eta \sin(2\pi\lambda t) \tag{Equation 1}$$

where $\mu_L$ is the mean illumination, $\eta$ is the modulus of the illumination source, and $\lambda$ is the modulation frequency applied to the illuminator 104. The modulation frequency is sufficiently high (e.g., 12.5 MHz) to attain sufficiently accurate range estimates. The output beam 108 is directed toward the scene 102 and a reflected beam 110 is directed back toward a receiving section 112. As is well known, the reflected beam 110 is a delayed version of the transmitted output beam 108, with the amount of phase delay being a function of the distance of the scene 102 from the range imaging system. The reflected beam 110 strikes a photocathode 114 within an image intensifier 116, thereby producing a modulated electron stream proportional to the input amplitude variations. The output of the image intensifier 116 is modeled by:

$$M(t) = \mu_M + \gamma \sin(2\pi\lambda t) \tag{Equation 2}$$

where $\mu_M$ is the mean intensification, $\gamma$ is the modulus of the intensification and $\lambda$ is the modulation frequency applied to the intensifier 116. The purpose of the image intensifier is not only to intensify the image, but also to act as a frequency mixer and shutter. Accordingly, the image intensifier 116 is connected to the modulator 106, causing the gain of a microchannel plate 118 to modulate. The electron stream from the photocathode 114 strikes the microchannel plate 118 and is mixed with a modulating signal from the modulator 106. The modulated electron stream is amplified through secondary emission by the microchannel plate 118. The intensified electron stream bombards a phosphor screen 120, which converts the energy into a visible light image. The intensified light image signal is captured by a capture mechanism 122, such as a charge-coupled device (CCD). The captured image signal is applied to a range processor 124 to determine the phase delay at each point in the scene. The phase delay term $\omega$ of an object at a range $\rho$ meters is given by:

$$\omega = \frac{2\rho\lambda}{c} \bmod 2\pi \tag{Equation 3}$$

where c is the velocity of light in a vacuum. Consequently, the reflected light at this point is modeled by:

$$R(t) = \kappa\mu_L + \kappa\eta \sin(2\pi\lambda t + \omega) \tag{Equation 4}$$

where $\kappa$ is the modulus of illumination reflected from the object. The pixel response P at this point is an integration of the reflected light and the effect of the intensification:

$$P = \int_0^{2\pi} R(t)M(t)dt = 2\kappa\mu_L\mu_M + \kappa\eta\pi\gamma\cos(\omega) \quad \text{(Equation 5)}$$

In the range imaging system disclosed in the aforementioned U.S. Pat. No. 4,953,616, which is incorporated herein by reference, a reference image is captured during which time the micro-channel plate is not modulated, but rather kept at a mean response. The range is estimated for each pixel by recovering the phase term as a function of the value of the pixel in the reference image and the phase image.

A preferred, more robust approach for recovering the phase term is described in the aforementioned U.S. Pat. No. 6,118,946, which is incorporated herein by reference. Instead of collecting a phase image and a reference image, this approach collects at least three phase images (referred to as an image bundle). This approach shifts the phase of the intensifier 116 relative to the phase of the illuminator 104, and each of the phase images has a distinct phase offset. For this purpose, the range processor 124 is suitably connected to control the phase offset of the modulator 106, as well as the average illumination level and such other capture functions as may be necessary. If the image intensifier 116 (or laser illuminator 104) is phase shifted by $\theta_i$, the pixel response from equation (5) becomes:

$$P_i = 2\kappa\mu_L\mu_M\pi + \kappa\eta\pi\gamma\cos(\omega+\theta_i) \quad \text{(Equation 6)}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with unique phase shifts is sufficient to determine $\omega$. For simplicity, the phase shifts are given by $\theta_k = 2\pi k/3$; k=0,1,2. In the following description, an image bundle shall be understood to include a collection of images which are of the same scene, but with each image having a distinct phase offset obtained from the modulation applied to the intensifier 116. The image bundle may also include the estimated range image, and any intensity (including color, as described in the aforementioned U.S. patent application Ser. No. 09/572,522, which is incorporated by reference herein) image of the same scene. It should also be understood that an analogous analysis can be performed by phase shifting the illuminator 104 instead of the intensifier 116. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with $n \geq 3$ distinct phase offsets of the intensifier (or laser or a combination of both) these images form part of the image bundle. Applying Equation (6) to each phase offset image in the image bundle and expanding the cosine term (i.e., $P_i = 2\kappa\mu_L\mu_M\pi + \kappa\eta\pi\gamma(\cos(\omega)\cos(\theta_i) - \sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Equation 7)}$$

where $\Lambda_1 = 2\kappa_l\mu_L\mu_M\pi$, $\Lambda_2 = \kappa\eta\pi\gamma\cos\omega$, and $\Lambda_3 = \kappa\eta\pi\gamma\sin\omega$. This system of equations is solved by a singular value decomposition to yield the vector $\Lambda = [\Lambda_1, \Lambda_2, \Lambda_3]^T$. Since this calculation is carried out at every (x,y) location in the phase offset images of the image bundle, $\Lambda$ is really a vector image containing a three element vector at every point. The phase term $\omega$ is computed at each point using a four-quadrant arctangent calculation:

$$\omega = \tan^{-1}(\Lambda_3, \Lambda_2) \quad \text{(Equation 8)}$$

The resulting collection of phase values at each point forms the phase image. Once phase has been determined, range r can be calculated by:

$$r = \omega \frac{c}{4\pi\lambda} \quad \text{(Equation 9)}$$

Equations (1)–(9) thus describe a method of estimating range using an image bundle with at least three images (i.e., n=3) corresponding to distinct phase offsets of the intensifier and/or illuminator.

Figure 2:
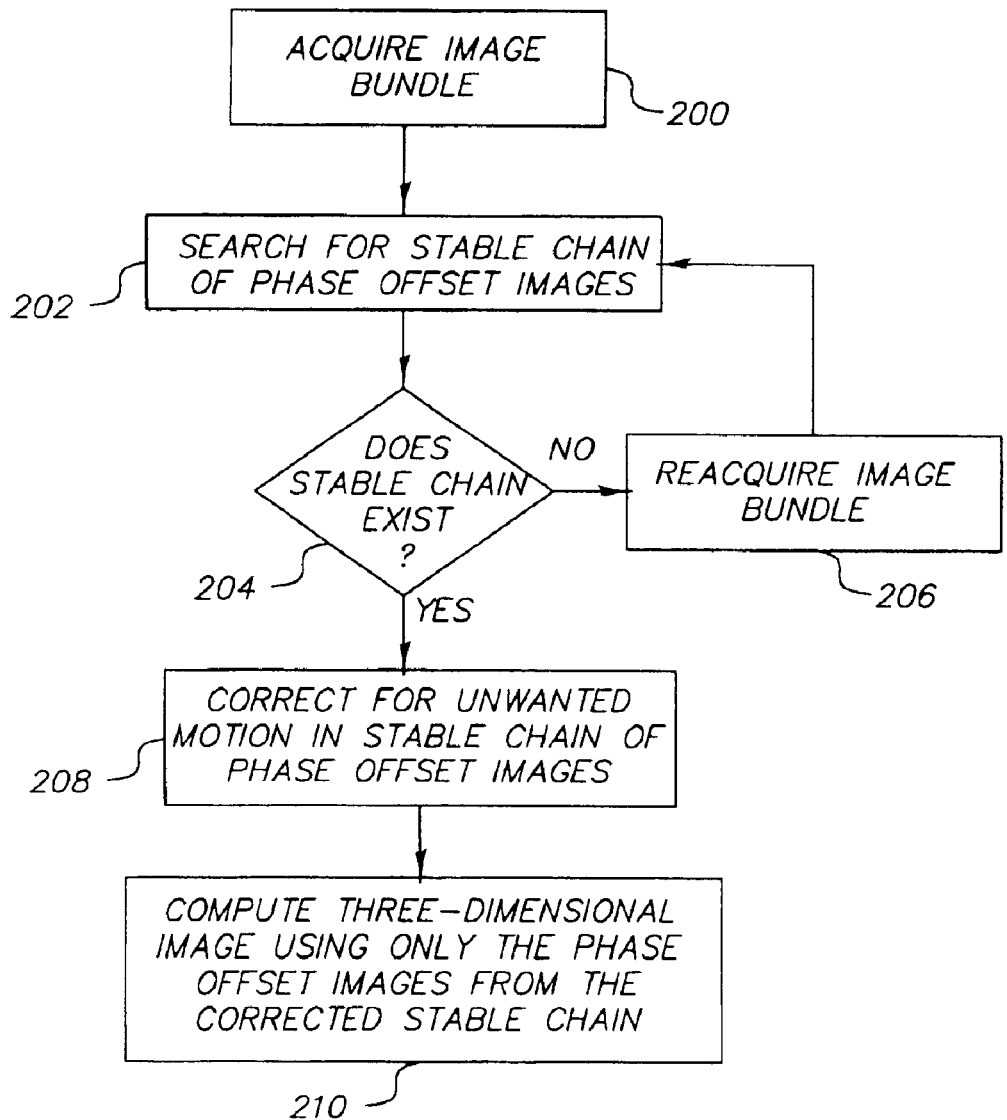
FIG. 2 is a block diagram of a method, according to the present invention, of generating a stabilized three-dimensional image from a sequence of phase offset images containing unwanted motion.

Referring now to FIG. 2, the present invention generates a stabilized three-dimensional image from phase offset images captured by a scannerless range imaging system, where the phase offset images contain unwanted motion. In the first step, the SRI system acquires 200 the image bundle containing the intensity image of the scene, and the sequence of phase offset images. After the image bundle has been acquired 200, the present invention searches 202 for a stable chain of phase offset images. A stable chain of a sequence of images $A = \{A_1, A_2, \ldots, A_n\}$ is defined as any subsequent $B = \{B_1, B_2, \ldots, B_k\} \subseteq A$ with $k \geq 3$ that satisfies $\Psi_M(B_i, B_{i+1}) \geq \rho_M$ for all i<k, where $\Psi_M(B_i, B_{i+1})$ is a measure of the confidence that the motion model M describes the actual unwanted motion between images $B_i$ and $B_{i+1}$, and where $\rho_M$ is a chosen threshold. (The constraint that $k \geq 3$ is imposed because at least three phase offset images are required to form a three-dimensional image.) For example, consider modeling the unwanted motion by a (x,y) translation in the image plane. Then the phase correlation SNR (signal/rms noise ratio) $\Psi_M(B_i, B_{i+1}) = Nz/\sqrt{1-z^2}$, where N is the square root of the total number of pixels in each image, and z is the peak amplitude of the phase correlation function between $B_i$ and $B_{+1}$, is a direct measure of the confidence that this translational motion model adequately describes the unwanted motion between $B_i$ and $B_{i+1}$. (Phase correlation and the phase correlation SNR are described by C. Kuglin and D. Hines, "The Phase Correlation Image Alignment Method," *Proc. 1975 Int'l. Conf. On Cybernetics and Society*, pp. 163–165). In this example, an appropriate threshold would be $\rho_M = N/\sqrt{3}$, which corresponds to a peak amplitude of z=½. Thus, a stable chain is obtained by testing the phase offset images against a confidence measure that separates less severe correctable image motion from more severe image motion and then populating the stable chain only with those phase offset images that meet the confidence measure for correctable image motion.

Once the search 202 for a stable chain of phase offset images has been completed, a query 204 is made of whether there exists a stable chain. A negative response indicates that it is not possible to generate a robust three-dimensional image from the current image bundle; therefore, an image bundle is reacquired 206, and the search for the stable chain begins anew. An affirmative response indicates that the unwanted motion present in the phase offset images in the stable chain is corrected 208, and that the corrected stable chain of phase offset images may be used to compute 210 the three dimensional image (using the aforementioned singular value decomposition technique). The correction of the unwanted motion present in the phase offset images of the stable chain should follow the motion model used to determine if the images form a stable chain. For example, in the previously described example of using the phase correlation SNR to judge confidence in a translational model, the unwanted motion is removed simply by translating the images in the stable chain according to the offsets provided by the location of the phase correlation peak.

Figure 3:
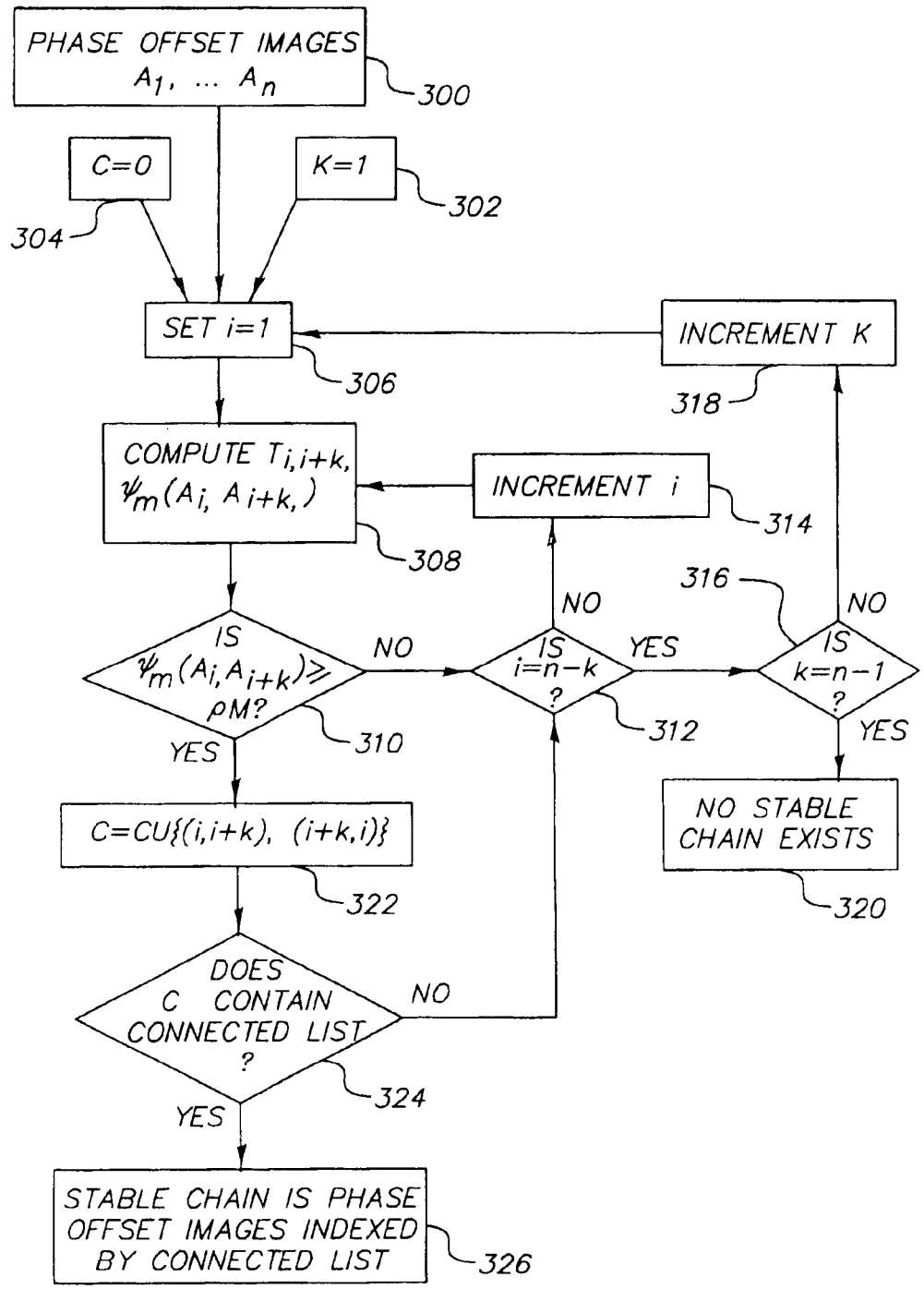
FIG. 3 is a block diagram of a detailed embodiment of the step of searching for a stable chain of phase offset images, as shown in FIG. 2.

Referring now to FIG. 3, an embodiment of the step 202 of searching for a stable chain of phase offset images is described. This embodiment requires as input the collection of phase offset images 300, labeled $A_1, A_2, \ldots, A_n$, a counter k 302 initialized to k=1, and a set C 304 initialized to the null set C=$\phi$. In step 306, a counter i is initialized to i=1. Phase correlation is performed in step 308 to determine the translational difference $T_{i,i+k}$ between phase offset images $A_i$ and $A_{i+k}$, and the corresponding phase correlation SNR $\Psi_M(A_i, A_{i+k}) = Nz/\sqrt{1-z^2}$ is computed. A query 310 is made as to whether $\Psi_M(A_i, A_{i+k}) \geq \rho_M$, where $\rho_M = N/\sqrt{3}$ is the aforementioned threshold. A negative response to query 310 indicates that a query 312 is made as to whether i=n-k. A negative response to query 312 indicates that i is incremented by one 314, and the process returns to step 308. An affirmative response to query 312 indicates that a query 316 is made as to whether k=n-1. A negative response to query 316 indicates that k is incremented by one 318, and the process returns to step 306. An affirmative response to query 316 indicates that no stable chain exists 320, so the search for a stable chain of phase offset images is complete. The effect of such looping, as described above, through these steps 306 through 318 is to test all permutations of paired combinations of the images against the phase correlation threshold in step 310.

Accordingly, an affirmative response to query 310 indicates that the ordered image pairs $A_i, A_{i+k}$ have met the test for phase correlation. Consequently, the images $A_i, A_{i+k}$, or alternatively the indices for the ordered pairs (i,i+k) and (i+k,i), are added to the set C 322. A query 324 is made as to whether the set C contains a connected list. A connected list is defined as a set of two ordered pairs $(x_1, y_1)$ and $(x_2, y_2)$ in C (where $x_i, y_i$ are the respective image numbers for a given ordered pair) satisfying $y_1 = x_2$ and $x_1 \neq y_2$. For example, given a collection of five images $A_1 \ldots A_5$, where it will ultimately be necessary to have a continuity of at least three images for range estimates, if the ordered pairs are images (1,2) and (3,4), then a connected list does not exist because continuity is lacking across the three images, i.e., in this example the motion model is unable to describe the motion between images 2 and 3. However, if the ordered pairs are, e.g., images (1,2) and (2,3), or images (1,3) and (3,4), then the conditions for a connected list are met because continuity is present across all three images. A negative response to query 324 indicates that the process returns to step 312. An affirmative response to query 324 indicates that a stable chain has been found. The stable chain is given by the phase offset images indexed by the connected list 326 (i.e., if the connected list is given by ordered pairs (x,y) and (y,w), the stable chain is given by $\{A_x, A_y, A_w\}$).

FIG. 3 describes one embodiment of the step 202 of the present invention, where the method of the invention is employed to search until the first stable chain of cardinality 3 is found, that is, a chain with three images in the connected list is found. In another embodiment, the cardinality of the stable chain can be greater than 3 in order to provide more than the minimum number of required phase offset images for the calculation of the range image. For example, if r phase offset images are desired to compute the three-dimensional image, and n≥r>3, then a connected list can be redefined as a set of r-1 ordered pairs $(x_1, y_1), (x_2, y_2), \ldots, (x_{r-1}, y_{r-1})$ in C satisfying $y_j = x_{j+1}$ for $j=1, 2, \ldots, r-2$ and $x_i \neq y_j$ whenever i≠j+1. With this more general definition of a connected list, the embodiment described in FIG. 3 searches until the first stable chain of cardinality r is found.

Figure 4:
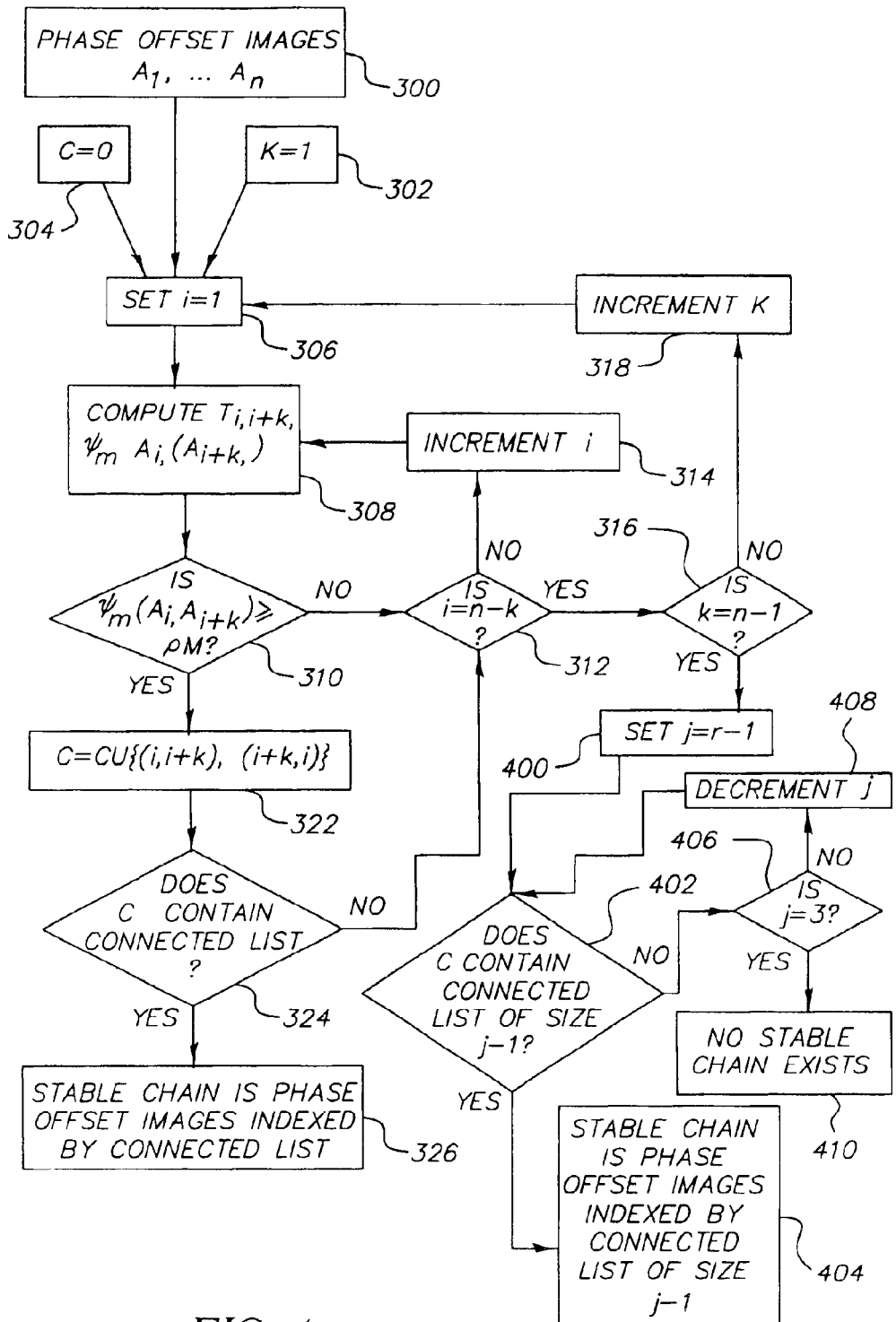
FIG. 4 is a block diagram of another detailed embodiment of the step of searching for a stable chain of phase offset images, as shown in FIG. 2.

In yet another embodiment, the search step 202 involves searching for the largest stable chain having cardinality less than or equal to r. Referring now to FIG. 4, in this embodiment, the search step is identical to the embodiment described in FIG. 3, with the exception that the general definition of a connected list from the preceding paragraph is used in the query 324, that is, the connected list is redefined as a set of r-1 ordered pairs, and with the addition of the process indicated by an affirmative response to query 316. An affirmative response to query 316 indicates that j is initialized 400 to j=r-1, and a query 402 is made as to whether C contains a connected list of size j-1. An affirmative response to query 402 indicates 404 that the stable chain is given by the phase offset images indexed by the connected list of size j-1. A negative response to query 402 indicates that a query 406 is made as to whether j=3. A negative response to query 406 indicates that j is decremented 408 by one, and the process returns to query 402. An affirmative response to query 406 indicates that no stable chain exists 410, so the search for a stable chain of phase offset images is complete.

In yet another embodiment, the search step 202 can involve searching for the best stable chain, where one stable chain is defined as better than another, for example, if the sum of the values $\Psi_M(A_i, A_{i+1})$ in stable chain A is greater than the sum of the values $\Psi_M(B_i, B_{i+1})$ of stable chain B.

In the preferred embodiment, the underlying assumption is that image stabilization, i.e., the process of removing any unwanted motion from a sequence of images, is most readily implemented upon global motion, with a motion model based on translation, that is, where the entire field of view is translated from one image to the next because, e.g., of camera motion. Since removal of local motion, that is, where individual objects relative to each other are moving from one image to the next, is a much more difficult proposition, and thus requires a more complicated motion model, one feature of the preferred embodiment is to construct a stable chain of images from global motion only.

In yet another embodiment, the search step 202 can involve a motion model that accounts for more than translational differences between successive images. For example, the motion model could be an affine model, projective model, or local motion model. In a projective model, for example, the search step can involve estimating the 2-D homography between pairs of phase offset images. The homography between two images models panning and tilting motion of the camera, and is therefore better suited in these situations than a purely translational model. Well-known techniques for homography estimation exist in the research literature (see Hartley, R. and Zisserman, A, "Multiple View Geometry", Cambridge University Press, 2000, Chapter 3). In some cases, such as local motion models, an appropriately defined $\Psi_M$ is not symmetric (i.e., $\Psi_M(B_i, B_{i+1}) \neq \Psi_M(B_{i+1}, B_i)$). In these cases, the embodiments described in FIGS. 3 and 4 are not adequate. In order to extend these embodiments to make them adequate for non-symmetric $\Psi_M$, step 322 would only add the ordered pair (i, i+1) to C, and then the entire process would need to be repeated with the phase offset images considered in reverse order.

Figure 5:
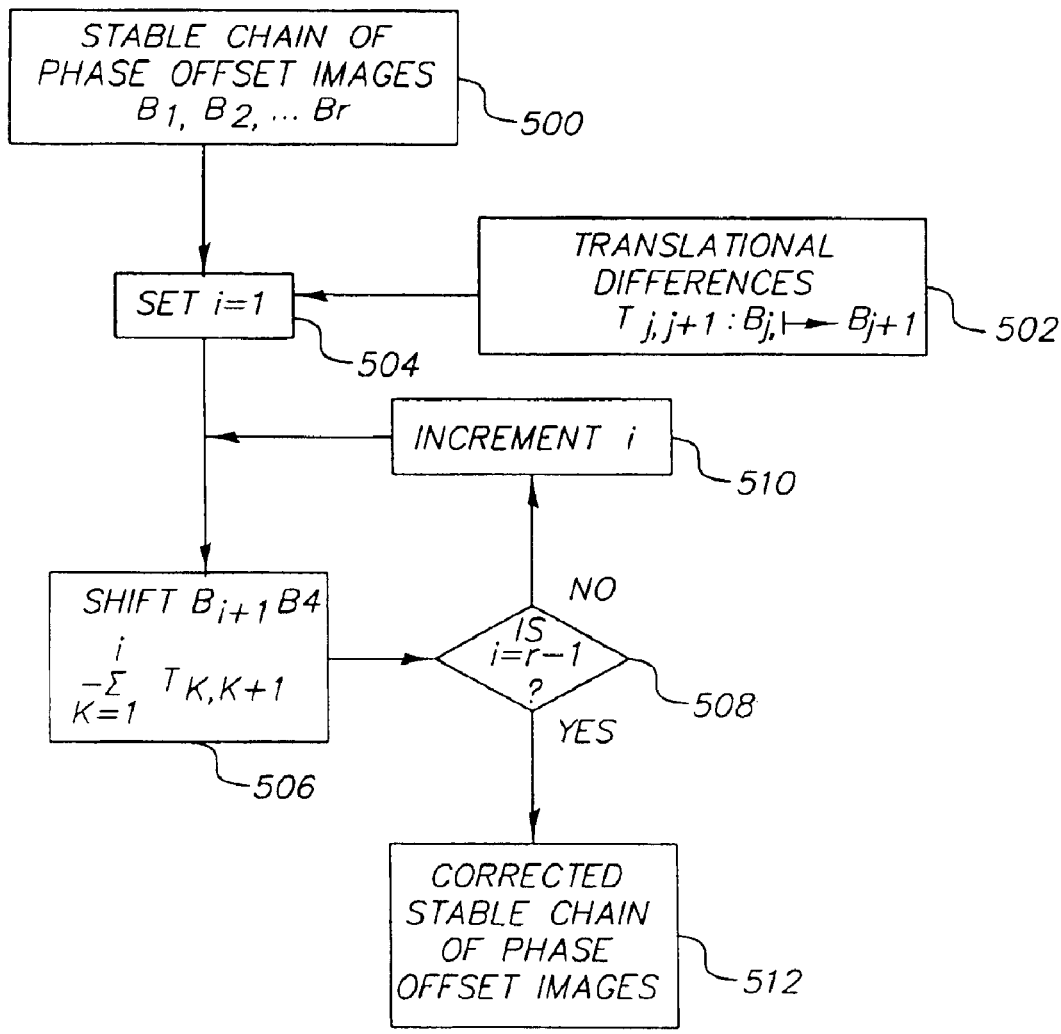
FIG. 5 is a block diagram of a detailed embodiment of the step of correcting the unwanted motion in a stable chain of phase offset images, as shown in FIG. 2.

Referring now to FIG. 5, an embodiment of the step 208 of correcting for unwanted motion in the stable chain of phase offset images is described. During the step 202 of searching for a stable chain, the translational difference $T_{i,i+k}$ between phase offset images $A_i$ and $A_{i+k}$ is computed for each value of i and k until a stable chain is found. Assuming a stable chain is found, we relabel the stable chain 500 of images $\{B_1, B_2, \ldots, B_r\}$ for simplicity, and relabel the indices of the corresponding translational differences 502 so that $T_{j,j+1}$ is the translational difference between $B_j$ and $B_{j+1}$. The counter i is initialized 504 to one, and phase offset image $B_{i+1}$ is shifted 506, or translated by $$-\sum_{k=1}^{i} T_{k,k+1}.$$

This shift corrects for the unwanted motion in phase offset image $B_{i+1}$ found by the translational model. A query 508 is made as to whether i=r−1, where r is the cardinality of the stable chain. A negative response to query 508 indicates that i is incremented 510 by one, and the process continues at step 506. An affirmative response to query 508 indicates that all phase offset images in the stable chain have been corrected 512 for unwanted motion, which completes step 208.

The invention has been described in detail with particular reference to certain preferred embodiments thereof, but it will be understood that variations and modifications can be effected within the spirit and scope of the invention.

PARTS LIST

100 SRI camera
102 scene
104 illuminator
106 modulator
108 output beam
110 reflected beam
112 receiving section
114 photocathode
116 image intensifier
118 microchannel plate
120 phosphor screen
122 capture mechanism
124 range processor
200 acquire image bundle step
202 stable chain search step
204 query
206 reacquire image bundle step
208 correct unwanted motion step
210 compute three-dimensional image step
300 phase offset images
302 initialize k
304 initialize C
306 initialize i
308 compute unwanted motion and confidence
310 query
312 query
314 increment
316 query
318 increment k
320 no stable chain
322 add ordered pairs to C
324 query
326 stable chain
400 initialize j
402 query
404 stable chain
406 query
408 decrement j
410 no stable chain
500 stable chain
502 translational differences
504 initialize i
506 shift phase offset image
508 query
510 increment i
512 corrected stable chain.

What is claimed is:

1. A method for generating a stabilized three-dimensional image from a scannerless range imaging system of the type comprising an illuminator for illuminating a scene with modulated illumination; an image modulating component for receiving and modulating the modulated illumination reflected from the scene; an image capture element for capturing images output by the image modulating component, including a bundle of at least three phase offset images each incorporating a phase delay corresponding to the distance of objects in the scene from the illuminator, wherein each phase offset image also incorporates a phase offset unique for each image, said method comprising the steps of:

acquiring a bundle of three or more phase offset images corresponding to the modulated illumination reflected from the scene, whereby one or more of the phase offset images includes image motion relative to another phase offset image;

searching for a stable chain of phase offset images in the image bundle, wherein a stable chain is a collection of images that is obtained by testing the phase offset images against a confidence measure that separates less severe correctable image motion from more severe image motion and then populating the stable chain only with those phase offset images that meet the confidence measure for correctable image motion;

correcting for the image motion in the stable chain of images if a stable chain of at least three phase offset images is found to exist; and computing a stabilized three-dimensional image using corrected phase offset images from the stable chain of phase offset images.

2. The method as claimed in claim 1 wherein the motion between the phase offset images may be either global motion of all objects or localized motion between objects in consecutive images.

3. The method as claimed in claim 2 wherein the stable chain is found to exist between phase offset images exhibiting global motion.

4. The method as claimed in claim 2 wherein the stable chain is found to exist between phase offset images exhibiting local motion.

5. The method as claimed in claim 1 wherein the confidence measure employed in the step of searching for a stable chain of phase offset images comprises testing ordered pairs of phase offset images in the bundle against a phase correlation threshold.

6. The method as claimed in claim 1 wherein the step of searching for a stable chain of phase offset images further comprises collecting two or more ordered pairs that meet the confidence measure in a connected list, where a connected list is defined as a set of at least two ordered pairs $(x_1,y_1)$ and $(x_2,y_2)$ in the list satisfying $y_1=x_2$ and $x_1 \neq y_2$.

7. The method as claimed in claim 1 wherein the step of searching for a stable chain of phase offset images further comprises the step of requiring an image bundle if a stable chain of at least three phase offset images does not exist.

8. A method for generating a stabilized three-dimensional image from a scannerless range imaging system of the type comprising an illuminator for illuminating a scene with modulated illumination; an image modulating component for receiving and modulating the modulated illumination reflected from the scene; an image capture element for capturing images output by the image modulating component, including a bundle of at least three phase offset images each incorporating a phase delay corresponding to the distance of objects in the scene from the illuminator, wherein each phase offset image also incorporates a phase offset unique for each image, said method comprising the steps of:

acquiring a bundle of three or more phase offset images corresponding to the reflected modulated illumination, whereby one or more of the phase offset images may be subject to movement with respect to another phase offset image;

choosing a motion model for estimating movement between the images;

searching for a stable chain of phase offset images in the image bundle, where a stable chain is a collection of images that is found to exist where the motion model reveals a correlation between the images indicative of correctable global motion;

correcting for the global motion in the stable chain of images if a stable chain of at least three phase offset images is found to exist; and computing a stabilized three-dimensional image using corrected phase offset images from the stable chain of phase offset images.

9. The method as claimed in claim 8 wherein the motion model accounts for global translational differences between successive phase offset images.

10. The method as claimed in claim 8 wherein the motion model accounts for local motion differences between successive phase offset images.

11. The method as claim in claim 8 wherein the motion model is an affine model or a projective model.

12. The method as claimed in claim 8 wherein the step of searching for a stable chain of phase offset images comprises testing ordered pairs of phase offset images in the bundle against a phase correlation threshold.

13. The method as claimed in claim 8 wherein the step of searching for a stable chain of phase offset images comprises collecting two or more ordered pairs in a connected list, where a connected list is defined as a set of at least two ordered pairs $(x_1, y_1)$ and $(x_2, y_2)$ in the list satisfying $y_1 = x_2$ and $x_1 \neq y_2$.

14. The method as claimed in claim 8 wherein the step of searching for a stable chain of phase offset images further comprises the step of requiring an image bundle if a stable chain of phase offset images does not exist.

15. In a method for generating a three-dimensional image from a scannerless range imaging system of the type that computes range information from at least three images each incorporating a phase delay corresponding to the distance of objects in the scene from the range imaging system, the improvement wherein the method comprises the steps of:

acquiring a bundle of three or more images, whereby one or more of the images may be subject to unwanted movement with respect to another image;

searching for a stable chain of at least three images in the image bundle, where a stable chain is a collection of images that is found to exist where it is possible to characterize the unwanted movement between the images in relation to a motion model that is sensitive to a predetermined type of motion between the images;

if a stable chain of at least three phase offset images does not exist, requiring an image bundle until a stable chain is found to exist;

correcting for unwanted motion in the stable chain of images; and computing a stabilized three-dimensional image using the images from the stable chain of phase offset images.

16. The method as claimed in claim 15 wherein the motion model accounts for translational motion between the images.

17. The method as claimed in claim 15 wherein the step of searching for a stable chain of phase offset images comprises testing ordered pairs of images in the bundle against a phase correlation threshold derived from the motion model.

18. A scannerless range imaging system for generating a stabilized three-dimensional image, said system comprising:

an illuminator for illuminating a scene with modulated illumination;

an image modulating component for receiving and modulating the modulated illumination reflected from the scene;

an image capture element for capturing images output by the image modulating component, whereby one or more of the images also includes image motion relative to another image, said captured images including a bundle of at least three phase offset images each incorporating a phase delay corresponding to the distance of objects in the scene from the illuminator, wherein each phase offset image also incorporates a phase offset unique for each image; and a processor for processing the phase offset images captured by the image capture device, said processor performing the steps of:

searching for a stable chain of phase offset images in the image bundle, wherein a stable chain is a collection of images that is obtained by testing the phase offset images against a confidence measure that separates less severe correctable image motion from more severe image motion and then populating the stable chain only with those phase offset images that meet the confidence measure for correctable image motion;

correcting for the image motion in the stable chain of images if a stable chain of at least three phase offset images is found to exist; and computing a stabilized three-dimensional image using the phase offset images from the stable chain of phase offset images.

* * * * *